United States Patent
Uezu

(10) Patent No.: US 9,714,628 B2
(45) Date of Patent: Jul. 25, 2017

(54) AIR CLEANER

(71) Applicant: YAMAHA HATSUDOKI KABUSHIKI KAISHA, Iwata-shi, Shizuoka (JP)

(72) Inventor: Junji Uezu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 69 days.

(21) Appl. No.: 14/716,919

(22) Filed: May 20, 2015

(65) Prior Publication Data

US 2015/0377191 A1    Dec. 31, 2015

(30) Foreign Application Priority Data

Jun. 27, 2014  (JP) ................................ 2014-132923

(51) Int. Cl.

| F02M 35/02 | (2006.01) |
|---|---|
| B01D 46/00 | (2006.01) |
| B01D 46/42 | (2006.01) |
| B01D 46/24 | (2006.01) |
| F02M 35/024 | (2006.01) |
| F02M 35/08 | (2006.01) |

(52) U.S. Cl.
CPC ..... *F02M 35/0216* (2013.01); *B01D 46/0004* (2013.01); *B01D 46/0023* (2013.01); *B01D 46/2411* (2013.01); *B01D 46/4227* (2013.01); *F02M 35/02483* (2013.01); *F02M 35/02491* (2013.01); *F02M 35/084* (2013.01)

(58) Field of Classification Search
CPC  B01D 46/008; B01D 46/2414; B01D 46/521; B01D 46/4227; B01D 2279/30; B01D 2271/022

USPC .............................. 55/357, 385.3; 123/198 E
See application file for complete search history.

(56) References Cited

U.S. PATENT DOCUMENTS

| 5,609,658 | A | * | 3/1997 | Takemura | ............. | B01D 46/10 |
|---|---|---|---|---|---|---|
| | | | | | | 123/198 E |
| 6,299,661 | B1 | * | 10/2001 | Bloomer | ............. | F02M 35/021 |
| | | | | | | 55/385.3 |
| 6,402,798 | B1 | * | 6/2002 | Kallsen | ................. | B01D 35/30 |
| | | | | | | 220/293 |
| D752,728 | S | * | 3/2016 | McPhilliamy | ............... | D23/364 |

(Continued)

FOREIGN PATENT DOCUMENTS

JP    2008-115697 A    5/2008

*Primary Examiner* — Jacob T Minskey
*Assistant Examiner* — Minh-Chau Pham
(74) *Attorney, Agent, or Firm* — Keating and Bennett, LLP

(57) ABSTRACT

An air cleaner includes an air cleaner case, a first filter element, a lid, at least one first engagement portion, and at least one second engagement portion. The air cleaner case includes an opening. The first filter element is preferably tubular and detachably disposed inside the air cleaner case. The lid is disposed on an extension line of an axis of the first filter element to cover the opening. The lid includes a rotatable handle. The first engagement portion rotates with rotation of the handle. The second engagement portion engages with the first engagement portion. When the first engagement portion is rotated along a first direction and engaged with the second engagement portion, the lid is fixed to the air cleaner case. When the first engagement portion is rotated along a second direction and disengaged from the second engagement portion, the lid is detached from the air cleaner case.

17 Claims, 12 Drawing Sheets

(56) References Cited

U.S. PATENT DOCUMENTS

| | | | |
|---|---|---|---|
| 2006/0219452 A1* | 10/2006 | Okada | B60R 16/04 |
| | | | 180/68.5 |
| 2008/0028937 A1* | 2/2008 | Paterson | B03C 3/66 |
| | | | 96/81 |
| 2008/0098701 A1 | 5/2008 | Takeshima et al. | |
| 2009/0249754 A1* | 10/2009 | Amirkhanian | B01D 46/008 |
| | | | 55/357 |
| 2015/0375614 A1* | 12/2015 | Osaki | B60K 13/02 |
| | | | 180/291 |

* cited by examiner

AIR CLEANER

This application claims priority to Japanese Patent Application No. 2014-132923 filed in Japan on Jun. 27, 2014, the entire contents of which are hereby incorporated by reference.

BACKGROUND OF THE INVENTION

1. Field of the Invention

The present invention relates to air cleaners mounted on vehicles.

2. Description of the Related Art

A vehicle including an engine is provided with an air cleaner upstream of a suction pipe through which air is supplied to the engine. This arrangement aims to prevent foreign matter, such as dust or dirt, from mixing into air to be supplied to the engine (which will hereinafter be referred to as "suction air"). The air cleaner includes a filter element that cleans air, an air cleaner case that houses the filter element, and a lid that covers an opening of the air cleaner case.

Examples of such a vehicle include vehicles designed to travel over rough terrain. Among these vehicles are a recreational off-highway vehicle (hereinafter referred to as an "ROV") and a side-by-side all terrain vehicle (ATV). Unfortunately, when such a vehicle travels over rough terrain, foreign matter, such as dust, is likely to mix into the suction air, and the amount of dust, for example, contained in the suction air tends to increase. This necessitates frequent maintenance of the air cleaner, which includes, for example, cleaning and replacement of the filter element. In cleaning or replacing the filter element, a worker usually opens the lid attached to the air cleaner case, and then removes the filter element from the air cleaner case.

JP 2008-115697 A discloses an air cleaner including an air cleaner case that houses a filer element, and a lid that covers the air cleaner case. The air cleaner case and the lid of this air cleaner are fixed to each other with a plurality of C-shaped plate clips.

Because the plate clips are provided at a plurality of positions in the air cleaner disclosed in JP 2008-115697 A, a worker has to release all the plate clips to reach the filter element inside the air cleaner case, making it time-consuming to remove the filter element from the air cleaner case. Additionally, a certain force is required to release the plate clips, making it difficult to reach the filter element.

SUMMARY OF THE INVENTION

Accordingly, preferred embodiments of the present invention provide an air cleaner that enables a filter element to be easily removed in a short time and without much effort.

An air cleaner according to a preferred embodiment of the present invention includes an air cleaner case, a first filter element, a lid, at least one first engagement portion, and at least one second engagement portion. The air cleaner case is provided with an opening. The first filter element preferably has a tubular or substantially tubular shape and is detachably disposed inside the air cleaner case. The lid is disposed along an extension line of an axis of the first filter element and detachably attached to the air cleaner case so as to cover the opening. The lid includes a rotatable handle. The first engagement portion is configured to rotate in accordance with rotation of the handle. The second engagement portion is connected to the air cleaner case and arranged to engage with the first engagement portion. The lid is arranged so that when the first engagement portion is rotated along a first direction and thus engaged with the second engagement portion, the lid is fixed to the air cleaner case, and when the first engagement portion is rotated along a second direction opposite to the first direction and thus disengaged from the second engagement portion, the lid is detached from the air cleaner case.

The air cleaner according to the present preferred embodiment of the present invention enables the first engagement portion to rotate along the first or second direction with rotation of the handle. Upon rotation of the first engagement portion along the first direction, the first and second engagement portions are engaged with each other. This fixes the lid to the air cleaner case. In contrast, upon rotation of the first engagement portion along the second direction, the first and second engagement portions are disengaged from each other. This enables the lid to be detached from the air cleaner case. Thus, the lid is easily detached from or fixed to the air cleaner case by simply rotating the handle. The lid is disposed along the extension line of the axis of the first filter element. This allows the first filter element to be axially pulled out of the air cleaner case when the lid is detached from the air cleaner case, thus easily detaching the first filter element from the air cleaner case.

According to another preferred embodiment of the present invention, a rotation axis of the handle preferably extends parallel or substantially parallel to the axis of the first filter element and is preferably located inward of the first filter element.

This preferred embodiment enables the handle to be more compactly disposed in the lid than when the rotation axis of the handle is located outward of the first filter element.

According to still another preferred embodiment of the present invention, the rotation axis of the handle is preferably coaxial with the axis of the first filter element.

This preferred embodiment enables the handle to be more compactly disposed in the lid.

According to yet another preferred embodiment of the present invention, the first engagement portion preferably includes a first engagement surface arranged to come into contact with the second engagement portion. The second engagement portion preferably includes a second engagement surface arranged to come into contact with the first engagement surface of the first engagement portion and to be disposed between the first engagement surface and the handle. At least one of the first and second engagement surfaces includes an inclined surface inclined in a direction away from the handle along the first direction.

When the first engagement portion according to this preferred embodiment rotates along the first direction, the first engagement portion moves with the engagement surface of one of the engagement portions in contact with the inclined surface of the other engagement portion. This gradually moves the lid toward the air cleaner case so as to firmly fix the lid and the air cleaner case to each other.

According to still yet another preferred embodiment of the present invention, the inclined surface preferably includes a first inclined surface inclined in the direction away from the handle along the first direction, and a second inclined surface inclined in a direction toward the handle along the first direction. The first and second inclined surfaces are preferably continuous with each other at a point of the first engagement portion or the second engagement portion farthest from the handle.

When the first engagement portion according to this preferred embodiment rotates in the first direction, the engagement surface of one of the engagement portions moves along the first inclined surface of the other engagement portion. This gradually moves the lid toward the air cleaner case so as to firmly fix the lid and the air cleaner case to each other. Then, the engagement surface of the one of the engagement portions moves from the first inclined surface of the other engagement portion to the second inclined surface thereof. Consequently, the lid is prevented from being loosened from the air cleaner case in the second direction.

According to another preferred embodiment of the present invention, the first filter element is preferably secured between the lid and the air cleaner case.

The engagement of the first and second engagement portions firmly fixes the lid and the air cleaner case to each other. This secures the first filter element between the lid and the air cleaner case. Consequently, the first filter element is reliably secured inside the air cleaner case.

According to still another preferred embodiment of the present invention, the air cleaner preferably further includes a gasket disposed between the lid and an opening end portion of the air cleaner case.

The engagement of the first and second engagement portions firmly fixes the lid and the air cleaner case to each other. This applies forces from the air cleaner case and the lid to the gasket disposed between the lid and the opening end portion of the air cleaner case, thus enabling the gasket to more effectively seal a gap between the lid and the opening end portion of the air cleaner case.

According to yet another preferred embodiment of the present invention, the handle and the lid preferably are separate components. The handle is preferably rotatable relative to the lid. The lid is preferably non-rotatable relative to the air cleaner case.

When the lid according to this preferred embodiment is attached to or detached from the air cleaner case, only the handle rotates, while the lid does not rotate. This prevents wearing away of the gasket disposed between the air cleaner case and the lid.

According to still yet another preferred embodiment of the present invention, the air cleaner case preferably includes a support disposed inward of the first filter element. An axis of the support preferably extends parallel or substantially parallel to the axis of the first filter element. The second engagement portion is preferably disposed on the support.

The second engagement portion according to this preferred embodiment is disposed on the support located inward of the first filter element. This makes the lid and the air cleaner case smaller than when the second engagement portion is disposed outward of the first filter element.

According to another preferred embodiment of the present invention, the handle is preferably configured to rotate by an angle of about 360 degrees or less.

This preferred embodiment enables the lid to be easily detached from or fixed to the air cleaner case by simply rotating the handle by an angle of about 360 degrees or less.

According to still another preferred embodiment of the present invention, the first filter element preferably divides an inner space of the air cleaner case into a first chamber and a second chamber. The air cleaner preferably further includes a first suction pipe including an air inlet through which air is sucked into the first chamber from outside the air cleaner case, and at least one second suction pipe including an air outlet through which air inside the second chamber is discharged out of the air cleaner case.

The first chamber is located outside the first filter element, and the second chamber is located inside the first filter element. Thus, because the first chamber located outside the first filter element defines a "dirty side" chamber, this preferred embodiment makes it possible to visually determine contamination of the first filter element. Consequently, contamination of the first filter element is determined more easily than when the second chamber located inside the first filter element defines the dirty side chamber.

According to yet another preferred embodiment of the present invention, the lid is preferably disposed on an end of the air cleaner case opposite to a portion of the air cleaner case where the second suction pipe is disposed.

This preferred embodiment enables the lid to be easily attached to or detached from the air cleaner case no matter what structure the second suction pipe may have.

According to still yet another preferred embodiment of the present invention, the air cleaner preferably further includes a second filter element that divides the second chamber into an upstream chamber and a downstream chamber.

This preferred embodiment enables air, which has been sucked from outside the air cleaner case and passed through the first filter element, to be cleaned more effectively.

According to another preferred embodiment of the present invention, the second filter element is preferably disposed to intersect the extension line of the axis of the first filter element.

This preferred embodiment enables the second filter element to be compactly disposed inside the air cleaner case.

According to still another preferred embodiment of the present invention, the first filter element preferably includes mesh having a size larger than mesh in the second filter element.

This preferred embodiment enables the first filter element to catch large dust particles from air sucked in from outside the air cleaner case. The air is then further cleaned through the second filter element and thus effectively cleaned.

Various preferred embodiments of the present invention provide an air cleaner that enables a filter element to be easily removed in a short time.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
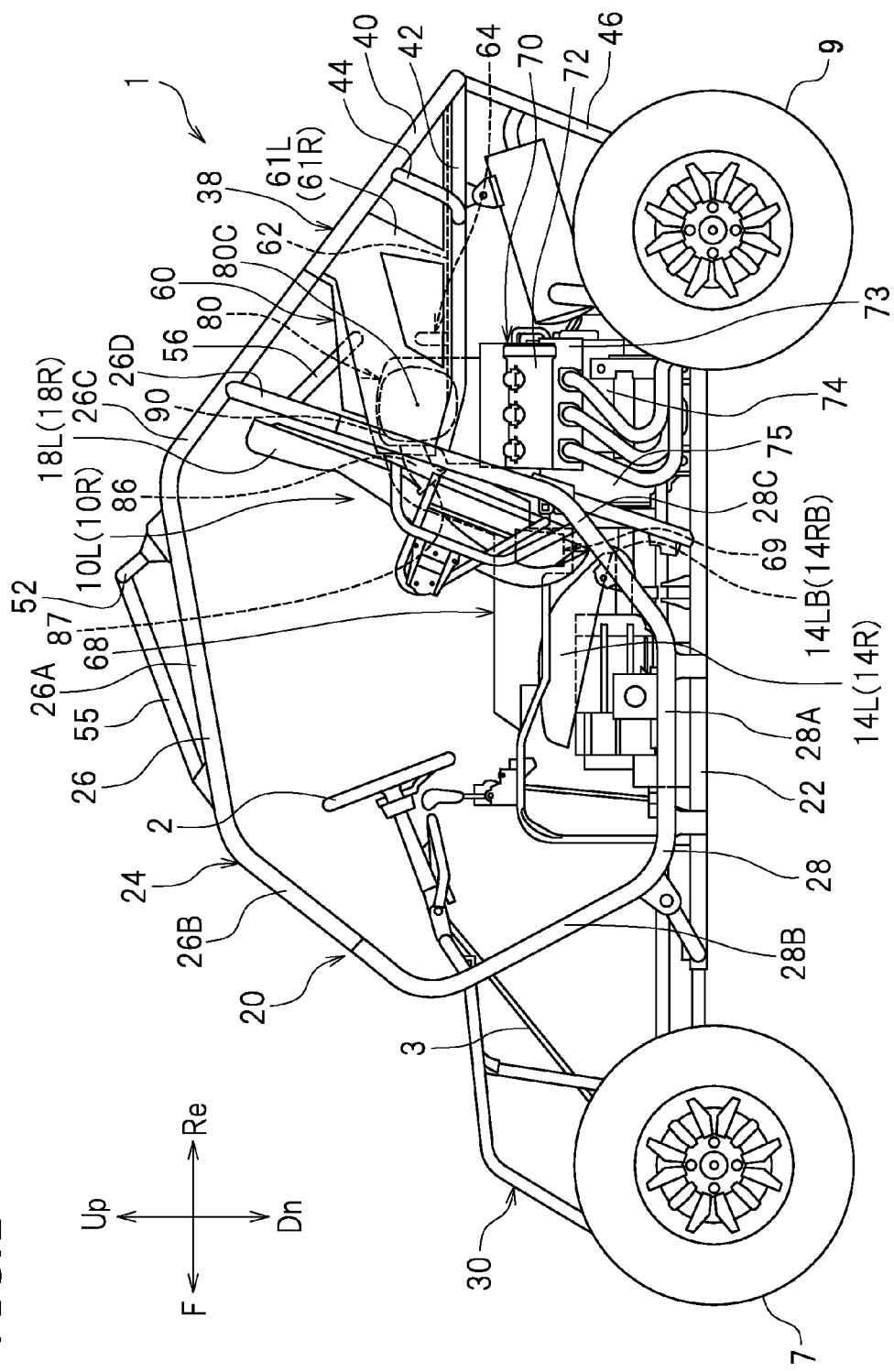
FIG. 1 is a left side view of an ROV according to a preferred embodiment of the present invention.

Hereinafter, preferred embodiments of the present invention will be described. As illustrated in FIG. 1, a vehicle according to the present preferred embodiment is preferably a recreational off-highway vehicle (ROV) 1, for example. The ROV 1 is suitable for traveling over rough terrain. The vehicle according to the present invention is not limited to an ROV. The vehicle according to the present invention may be a motorcycle, a motor tricycle or an all terrain vehicle (ATV), for example.

Unless otherwise noted, the terms "front", "rear", "right", "left", "up", and "down" respectively refer to front, rear, right, left, up, and down with respect to an occupant sitting on a first seat portion 14L of a first seat 10L of the ROV 1 in the following description. The terms "up" and "down" respectively refer to a vertically upward direction and a vertically downward direction when the ROV 1 is stationary on a horizontal plane. Reference signs "F", "Re", "R", "L", "Up", and "Dn" in the drawings respectively represent front, rear, right, left, up, and down.

As illustrated in FIG. 1, the ROV 1 preferably includes a body frame 20; the first seat 10L; a second seat 10R (see also FIG. 2); a cargo bed 60; an engine 70; an air cleaner 80; right and left front wheels 7; and right and left rear wheels 9.

The body frame 20 preferably is a pipe frame. The body frame 20 preferably includes a main frame 22 extending in a front-rear direction of the vehicle; a center frame 24 disposed above the main frame 22; a front frame 30 disposed in front of the center frame 24; and a rear frame 38 disposed behind the center frame 24.

The center frame 24 preferably includes upper center frames 26 and lower center frames 28. The upper center frames 26 are disposed above the lower center frames 28. Each upper center frame 26 is connected to the associated lower center frame 28. Each upper center frame 26 preferably includes a first portion 26A extending substantially in the front-rear direction of the vehicle; a second portion 26B extending obliquely downward and forward from a front end of the first portion 26A; a third portion 26C extending obliquely downward and rearward from a rear end of the first portion 26A; and a fourth portion 26D extending obliquely downward and forward from a location along the third portion 26C. Each lower center frame 28 is disposed above the main frame 22. Each lower center frame 28 is connected to the main frame 22. Each lower center frame 28 preferably includes a first portion 28A extending in the front-rear direction of the vehicle; a second portion 28B extending obliquely upward and forward from a front end of the first portion 28A; and a third portion 28C extending obliquely upward and rearward from a rear end of the first portion 28A. Each first portion 28A is connected to the main frame 22. Each second portion 28B is connected to the second portion 26B of the associated upper center frame 26. Each third portion 28C is connected to the fourth portion 26D of the associated upper center frame 26.

Figure 2:
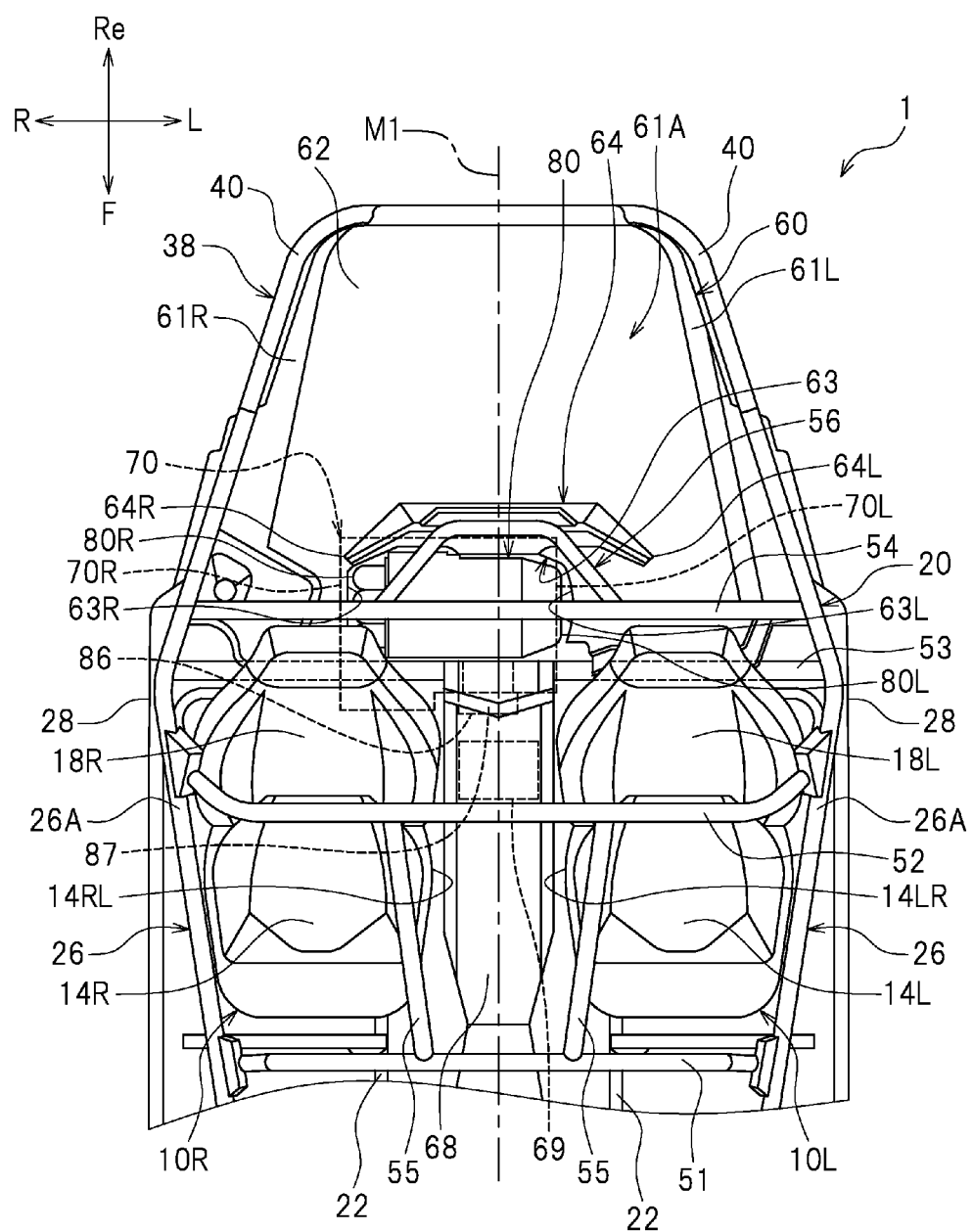
FIG. 2 is a plan view of the ROV according to a preferred embodiment of the present invention.

As illustrated in FIG. 2, the body frame 20 preferably further includes a first cross member 51, a second cross member 52, a third cross member 53, and a fourth cross member 54. The first to fourth cross members 51 to 54 each extend in a width direction of the vehicle. The second cross member 52 is disposed rearward relative to the first cross member 51. The first and second cross members 51 and 52 connect the right and left upper center frames 26 to each other. More specifically, the first and second cross members 51 and 52 connect the right and left first portions 26A to each other. The body frame 20 preferably further includes two connection frames 55 connecting the first and second cross members 51 and 52 to each other. The connection frames 55 extend substantially in the front-rear direction of the vehicle. The third cross member 53 is disposed rearward relative to the second cross member 52. The third cross member 53 connects the right and left lower center frames 28 to each other. The fourth cross member 54 is disposed rearward relative to the third cross member 53. The fourth cross member 54 connects the right and left upper center frames 26 to each other. More specifically, the fourth cross member 54 connects the right and left fourth portions 26D (see FIG. 1) to each other. The body frame 20 preferably further includes a guard frame 56 extending rearward from the fourth cross member 54. As illustrated in FIG. 1, the guard frame 56 extends obliquely downward and rearward from the fourth cross member 54 (see FIG. 2). Note that the right and left rear wheels 9 are not illustrated in FIG. 2.

As illustrated in FIG. 1, the rear frame 38 preferably includes upper rear frames 40, lower rear frames 42, first rear down frames 44, and second rear down frames 46. Each upper rear frame 40 extends obliquely downward and rearward from the third portion 26C of the associated upper center frame 26. Each lower rear frame 42 extends rearward from a location along the third portion 28C of the associated lower center frame 28. A rear end of each upper rear frame 40 is connected to a rear end of the associated lower rear frame 42. Each first rear down frame 44 extends obliquely downward and forward from a location along the associated upper rear frame 40. Each first rear down frame 44 is connected to a position along the associated lower rear frame 42. Each second rear down frame 46 extends obliquely downward and forward from the rear end of the associated lower rear frame 42. Each second rear down frame 46 is connected to a rear end of the main frame 22.

As illustrated in FIG. 1, the ROV 1 preferably includes a steering wheel 2. A steering shaft 3 is attached to the steering wheel 2. The ROV 1 preferably includes the right and left front wheels 7, and the right and left rear wheels 9. The right and left front wheels 7 are attached to an axle (not illustrated) provided on the front frame 30. The right and left rear wheels 9 are attached to an axle (not illustrated) provided on the rear frame 38. The right and left front wheels 7 are controlled by the steering wheel 2.

As illustrated in FIG. 2, the first and second seats 10L and 10R are supported by the body frame 20. More specifically, the first and second seats 10L and 10R are supported by the main frame 22. As illustrated in FIG. 1, the first seat 10L is disposed behind the steering wheel 2. As illustrated in FIG. 2, the second seat 10R is disposed rightward of the first seat 10L. The first and second seats 10L and 10R are aligned in the width direction of the vehicle. The first seat 10L preferably includes the first seat portion 14L on which an occupant sits, and a first backrest portion 18L. As illustrated in FIG. 1, the first seat portion 14L is disposed above the first portion 28A of the associated lower center frame 28. The first backrest portion 18L is disposed forward relative to the fourth portion 26D of the associated upper center frame 26. The first backrest portion 18L is disposed forward relative to the third portion 28C of the associated lower center frame 28. As illustrated in FIG. 2, the second seat 10R preferably includes a second seat portion 14R on which another occupant sits, and a second backrest portion 18R. As illustrated in FIG. 1, the second seat portion 14R is disposed above the first portion 28A of the associated lower center frame 28. The second backrest portion 18R is disposed forward relative to the fourth portion 26D of the associated upper center frame 26. The second backrest portion 18R is disposed forward relative to the third portion 28C of the associated lower center frame 28.

As illustrated in FIG. 1, the ROV 1 preferably further includes a battery case 68, and a battery 69 disposed inside the battery case 68. As illustrated in FIG. 2, the battery case 68 is disposed between the first and second seats 10L and 10R. The battery 69 is disposed between the first and second seats 10L and 10R. The battery 69 is disposed forward relative to the air cleaner 80. As illustrated in FIG. 1, the battery 69 is disposed above a lower end 14LB of the first seat portion 14L and a lower end 14RB of the second seat portion 14R.

As illustrated in FIG. 1, the engine 70 is supported by the body frame 20. More specifically, the engine 70 is supported by the main frame 22. The engine 70 is disposed below the lower rear frames 42. The engine 70 is disposed under the air cleaner 80. As illustrated in FIG. 2, the engine 70 is disposed rearward relative to the first and second seats 10L and 10R. The engine 70 is disposed rearward relative to the first seat portion 14L of the first seat 10L, and the second seat portion 14R of the second seat 10R. A left end 70L of the engine 70 is located leftward relative to the battery 69. A right end 70R of the engine 70 is located rightward relative to the battery 69. The engine 70 is disposed on a vehicle center line M1. The term "vehicle center line" refers to a line extending in the front-rear direction of the vehicle and passing through a vehicle width midpoint between the right and left front wheels 7 (see FIG. 1) and a vehicle width midpoint between the right and left rear wheels 9 (see FIG. 1) in a plan view of the vehicle.

As illustrated in FIG. 1, the engine 70 preferably includes a crankcase 75, a cylinder body 74, a cylinder head 73, and a cylinder head cover 72. The cylinder body 74 extends upward from the crankcase 75. The cylinder head 73 is disposed on the cylinder body 74 and connected to an upper portion of the cylinder body 74. The cylinder head cover 72 is disposed on the cylinder head 73 and connected to an upper portion of the cylinder head 73.

As illustrated in FIG. 1, the ROV 1 preferably includes the cargo bed 60. The cargo bed 60 is disposed rearward relative to the first and second seats 10L and 10R. The cargo bed 60 is disposed above the engine 70. The cargo bed 60 is attached to the rear frame 38. The cargo bed 60 is disposed above the lower rear frames 42. The cargo bed 60 preferably includes a bottom wall 61A (see FIG. 2); a left wall 61L extending upward from a left end of the bottom wall 61A; and a right wall 61R extending upward from a right end of the bottom wall 61A. The right and left walls 61R and 61L extend substantially in the front-rear direction of the vehicle. As illustrated in FIG. 2, the cargo bed 60 preferably includes a placement surface 62 on which cargo is to be placed. The placement surface 62 is defined by the bottom wall 61A. The placement surface 62 is provided with an opening 63. A left end 63L of the opening 63 is located leftward relative to a right end 14LR of the first seat portion 14L of the first seat 10L. A right end 63R of the opening 63 is located rightward relative to a left end 14RL of the second seat portion 14R of the second seat 10R. The cargo bed 60 preferably further includes a vertical wall 64. The vertical wall 64 extends upward from the placement surface 62. The vertical wall 64 also extends in the width direction of the vehicle. The vertical wall 64 is disposed behind the air cleaner 80. A left end 64L of the vertical wall 64 is located leftward relative to a left end 80L of the air cleaner 80. A right end 64R of the vertical wall 64 is located rightward relative to a right end 80R of the air cleaner 80. As illustrated in FIG. 1, the guard frame 56 is disposed above the vertical wall 64. As illustrated in FIG. 2, the vertical wall 64 overlaps with the guard frame 56 in the plan view of the vehicle.

As illustrated in FIG. 1, the air cleaner 80 is disposed rearward relative to the first and second seats 10L and 10R. At least a portion of the air cleaner 80 is located above the placement surface 62 of the cargo bed 60. At least a portion of the air cleaner 80 is exposed above the placement surface 62. A center position 80C of the air cleaner 80 in an up-down direction thereof is located above the placement surface 62. The up-down center position 80C of the air cleaner 80 is exposed above the placement surface 62. As illustrated in FIG. 2, the air cleaner 80 is disposed on the vehicle center line M1. The air cleaner 80 overlaps with the opening 63 of the placement surface 62 in the plan view of the vehicle. The placement surface 62 of the cargo bed 60 is disposed rightward and leftward of the air cleaner 80 in the plan view of the vehicle. The left end 80L of the air cleaner 80 is located leftward relative to the battery 69. The right end 80R of the air cleaner 80 is located rightward relative to the battery 69.

Figure 3:
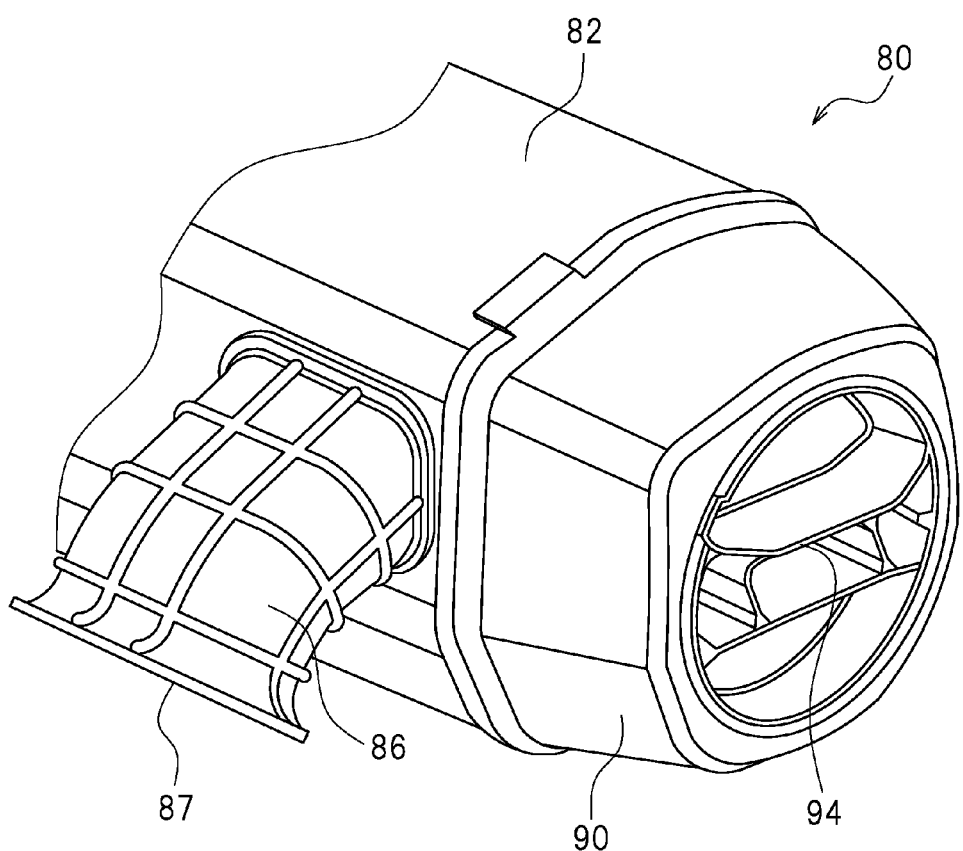
FIG. 3 is a perspective view of a portion of an air cleaner according to a preferred embodiment of the present invention.
Figure 4:
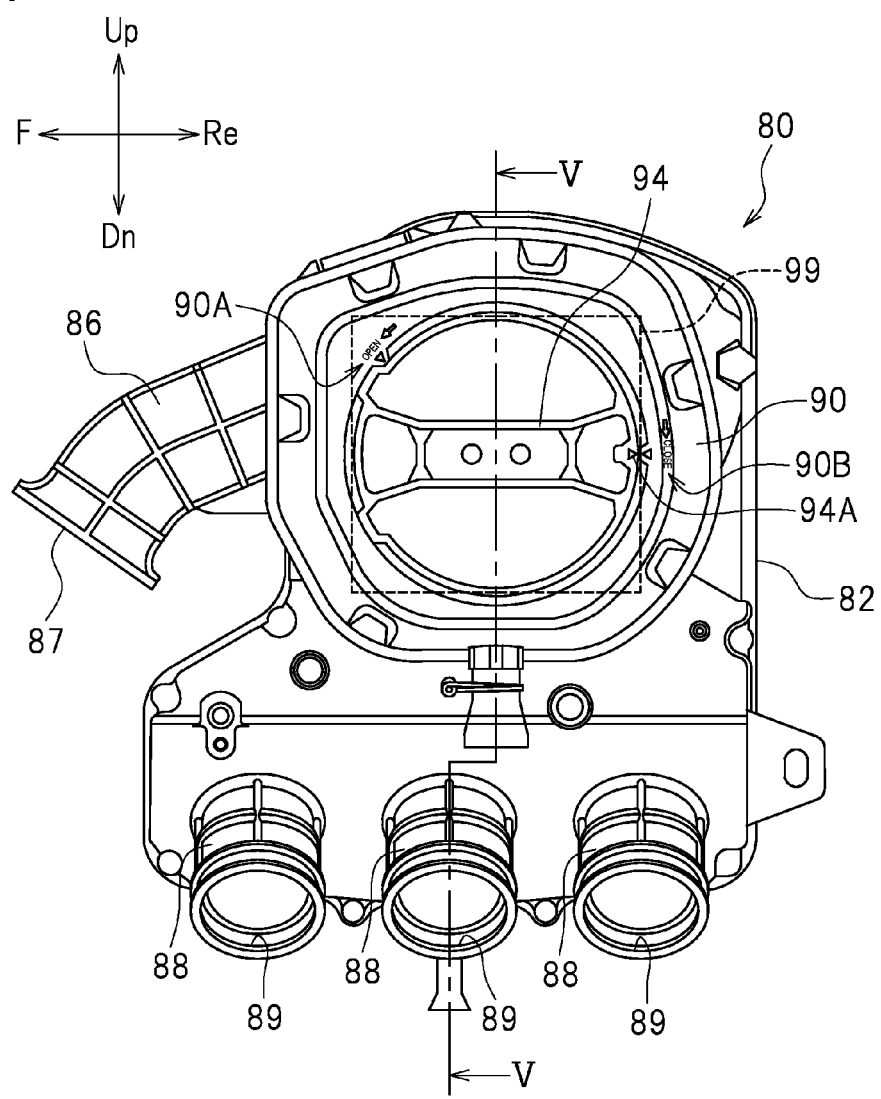
FIG. 4 is a left side view of the air cleaner according to a preferred embodiment of the present invention.
Figure 5:
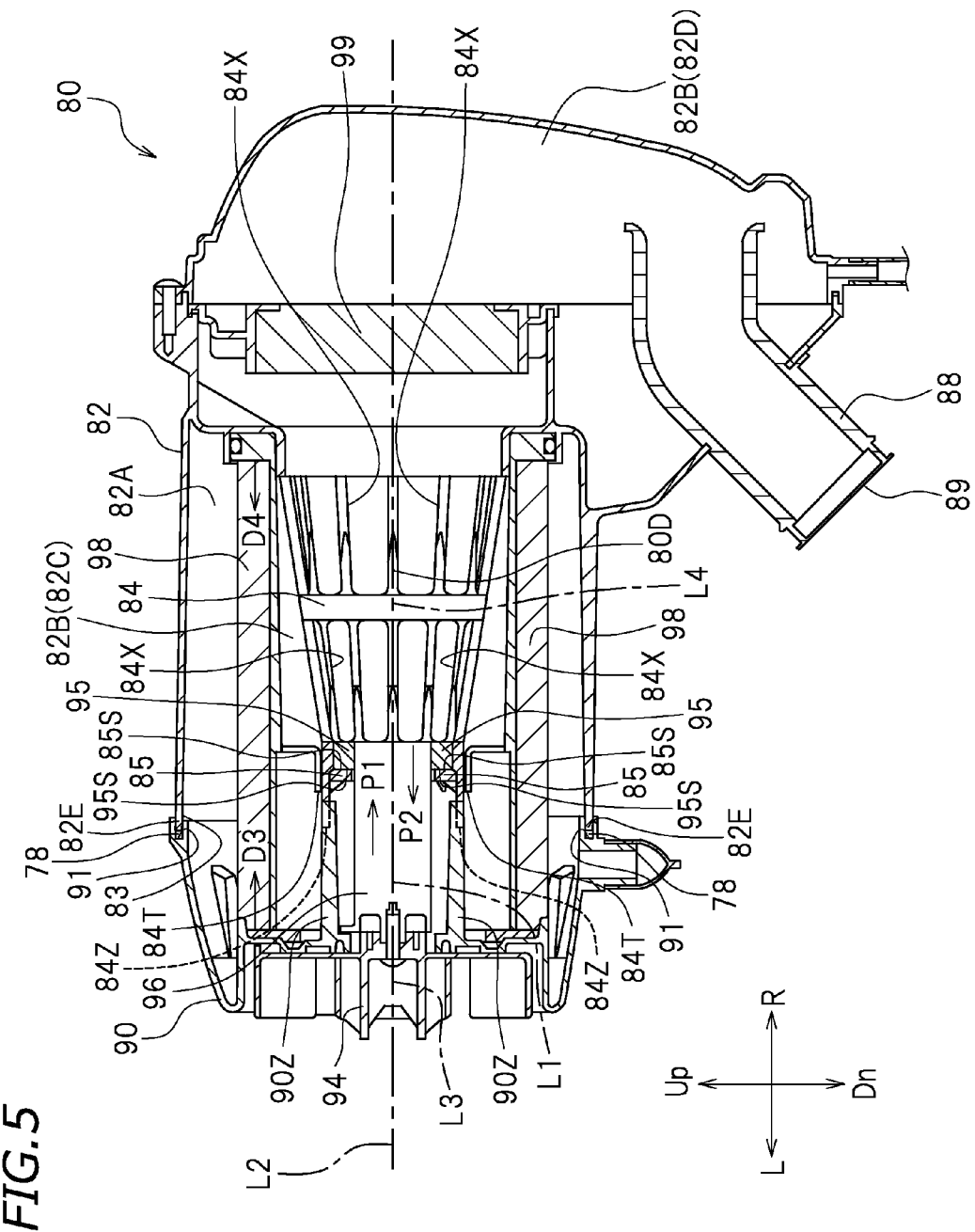
FIG. 5 is a cross-sectional view taken along the line V-V of FIG. 4.

As illustrated in FIG. 3, the air cleaner 80 preferably includes an air cleaner case 82; a lid 90 detachably attached to the air cleaner case 82; a first suction pipe 86; and second suction pipes 88 (see FIG. 4). As illustrated in FIG. 5, the air cleaner 80 preferably further includes a first filter element 98 and a second filter element 99. The first filter element 98 preferably has a tubular or substantially tubular shape. The second filter element 99 preferably has a rectangular or substantially rectangular shape. The first and second filter elements 98 and 99 are detachably disposed inside the air cleaner case 82.

As illustrated in FIG. 5, the air cleaner case 82 is provided with an opening 83. The air cleaner case 82 preferably includes a support 84. The support 84 is connected to the air cleaner case 82. The support 84 is disposed inside the air cleaner case 82. The support 84 is disposed inward of the first filter element 98. An axis L4 of the support 84 extends parallel or substantially parallel to an axis L1 of the first filter element 98. The axis L4 of the support 84 is preferably coaxial with the axis L1 of the first filter element 98. Alternatively, the axis L4 of the support 84 may be out of alignment with the axis L1 of the first filter element 98. The support 84 preferably has a truncated conical or substantially truncated conical shape, for example. Alternatively, the support 84 may have a circular cylindrical or a substantially circular cylindrical shape or a rectangular or a substantially rectangular prismatic shape. The support 84 is provided with a plurality of openings 84X through which air is allowed to flow. Although the support 84 is disposed inside the air cleaner case 82 in the present preferred embodiment, the support 84 may protrude out of the air cleaner case 82 from inside the opening 83 of the air cleaner case 82. An end portion 84T of the support 84 is provided with a rotation stopper 84Z. The lid 90 is provided with a rotation stopper 90Z. The rotation stopper 84Z is caught by the rotation stopper 90Z, thus stopping the lid 90 from rotating relative to the air cleaner case 82.

As illustrated in FIG. 5, the lid 90 covers the opening 83 of the air cleaner case 82. The lid 90 is provided with a groove 91 into which an opening end portion 82E of the air cleaner case 82 is inserted. As illustrated in FIG. 1, the lid 90 is exposed above the placement surface 62 of the cargo bed 60. As illustrated in FIG. 5, the lid 90 is disposed along an extension line L2 of the axis L1 of the first filter element 98. The axis L1 is a center of rotation of the first filter element 98 and located inward of the first filter element 98. The extension L2 is coaxial with the axis L1 and located outside of the first filter element 98. The lid 90 is disposed on an end of the air cleaner case 82 opposite to a portion of the air cleaner case 82 where the second suction pipes 88 are disposed. The lid 90 is disposed leftward of a center position 80D of the air cleaner 80 in the vehicle width direction. The second suction pipes 88 are disposed rightward of the center position 80D of the air cleaner 80 in the vehicle width direction. The lid 90 is disposed upward relative to the second suction pipes 88.

As illustrated in FIG. 3, the lid 90 preferably includes a rotatable handle 94, and a rod 96 (see FIG. 6) connected to the handle 94. The handle 94 preferably has disk shape or approximate disk shape. The handle 94 and the rod 96 are connected to each other with a bolt, for example (not illustrated). The handle 94 rotates by an angle of about 360 degrees or less. The handle 94 preferably rotates by an angle of about 180 degrees or less. The handle 94 and the lid 90 are separate components. The handle 94 is rotatable relative to the lid 90. In the present preferred embodiment, the lid 90 is attached to the air cleaner case 82 so as to be non-rotatable relative to the air cleaner case 82. The handle 94 rotates relative to the air cleaner case 82. Alternatively, the handle 94 and the lid 90 may be molded in one piece so that the lid 90 is attached to the air cleaner case 82 so as to be rotatable relative to the air cleaner case 82.

As illustrated in FIG. 5, the handle 94 and the rod 96 are disposed on the extension line L2 of the axis L1 of the first filter element 98. A rotation axis L3 of the handle 94 extends parallel or substantially parallel to the axis L1 of the first filter element 98 and is located inward of the first filter element 98. The rotation axis L3 of the handle 94 may be located outward of the first filter element 98. The rotation axis L3 of the handle 94 is preferably coaxial with the axis L1 of the first filter element 98. The rotation axis L3 of the handle 94 may be out of alignment with the axis L1 of the first filter element 98. As illustrated in FIG. 4, the handle 94 overlaps with the second filter element 99 in a side view of the vehicle.

As illustrated in FIG. 5, the air cleaner 80 preferably includes first engagement portions 95 configured to rotate in accordance with the rotation of the handle 94, and second engagement portions 85 arranged to engage with the first engagement portions 95.

Figure 6:
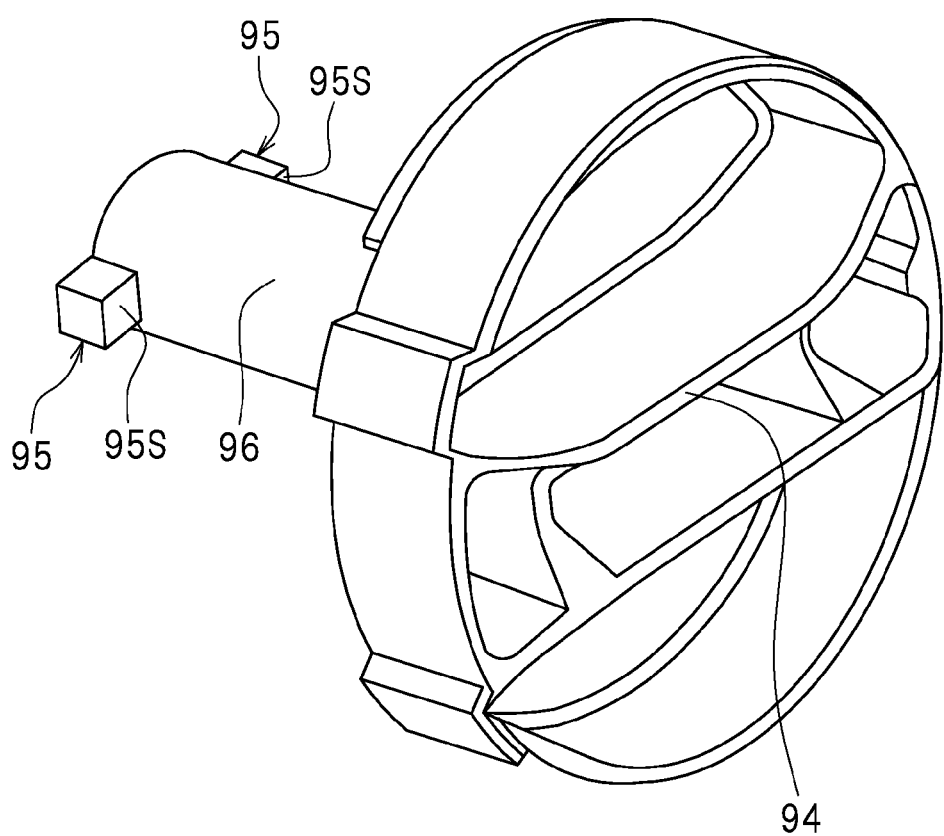
FIG. 6 is a perspective view of a handle and first engagement portions according to a preferred embodiment of the present invention.

As illustrated in FIG. 6, the first engagement portions 95 are provided on the rod 96. Each first engagement portion 95 protrudes outward from the rod 96 in a radial direction of the rod 96. Each first engagement portion 95 preferably includes a first engagement surface 95S arranged to come into contact with the associated second engagement portion 85 (see FIG. 7). Each first engagement surface 95S comes into contact with a second engagement surface 85S (see FIG. 7) of the associated second engagement portion 85 (which will be described below).

Figure 7:
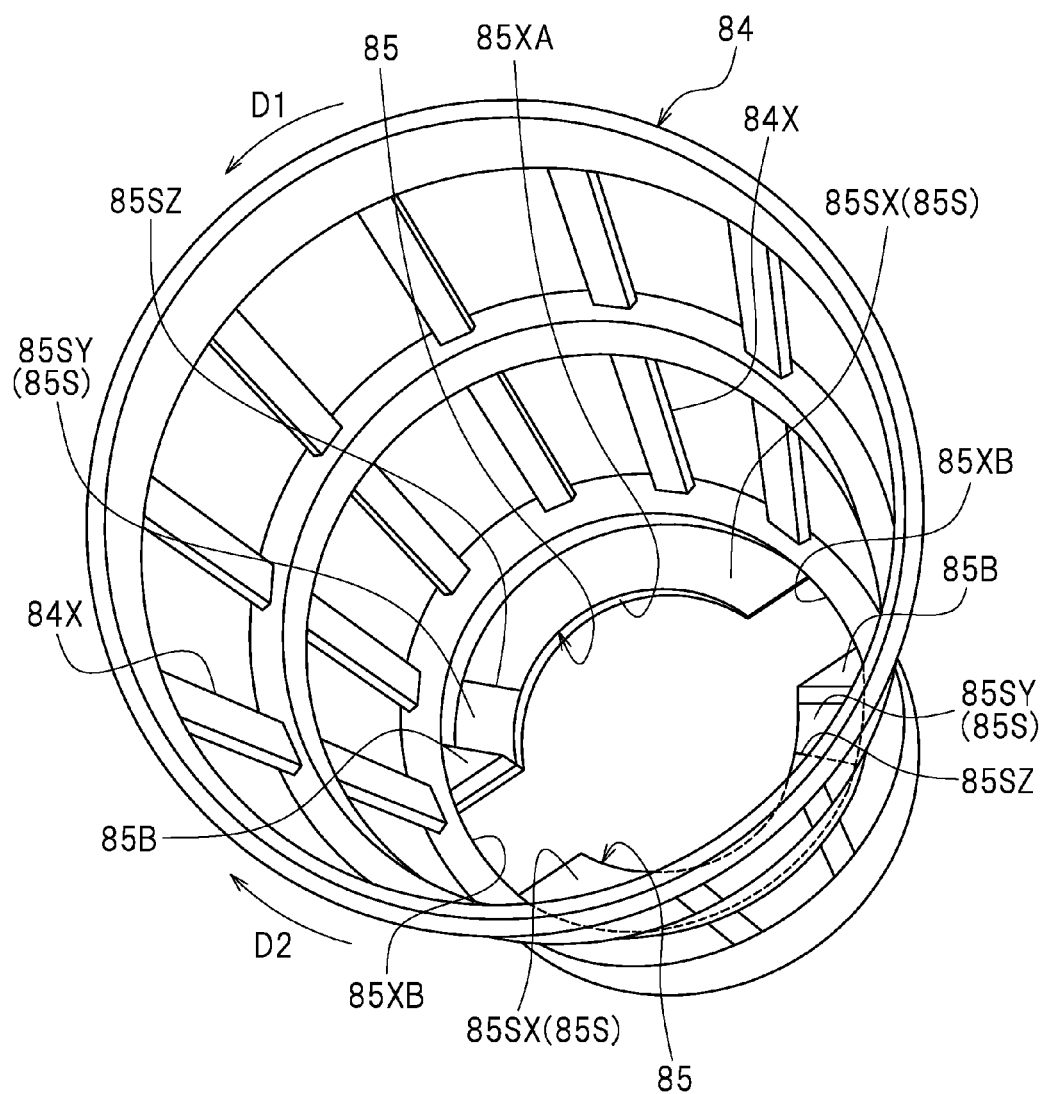
FIG. 7 is a perspective view of a support and second engagement portions according to a preferred embodiment of the present invention.

As illustrated in FIG. 5, each second engagement portion 85 is connected to the air cleaner case 82. Each second engagement portion 85 is provided on the support 84. As illustrated in FIG. 7, each second engagement portion 85 preferably includes the second engagement surface 85S arranged to come into contact with the first engagement surface 95S of the associated first engagement portion 95. Each second engagement portion 85 is provided with a first opening 85XA into which the rod 96 is inserted, and a second opening 85XB into which the associated first engagement portion 95 is inserted. The first and second openings 85XA and 85XB are preferably continuous with each other. As illustrated in FIG. 5, each second engagement surface 85S is disposed between the associated first engagement surface 95S and the handle 94 when the first and second engagement portions 95 and 85 are engaged with each other.

Figure 8:
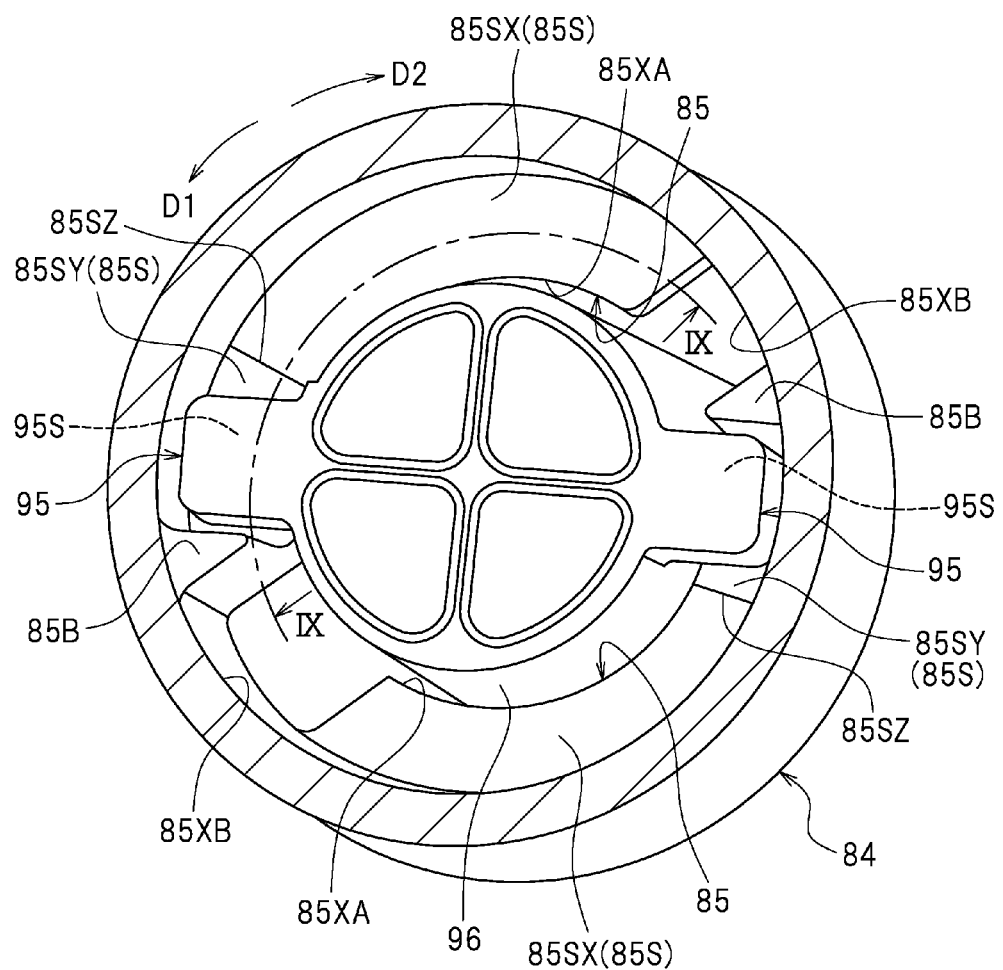
FIG. 8 is a perspective view of a portion of the air cleaner according to a preferred embodiment of the present invention, with the first and second engagement portions engaged with each other.
Figure 9:
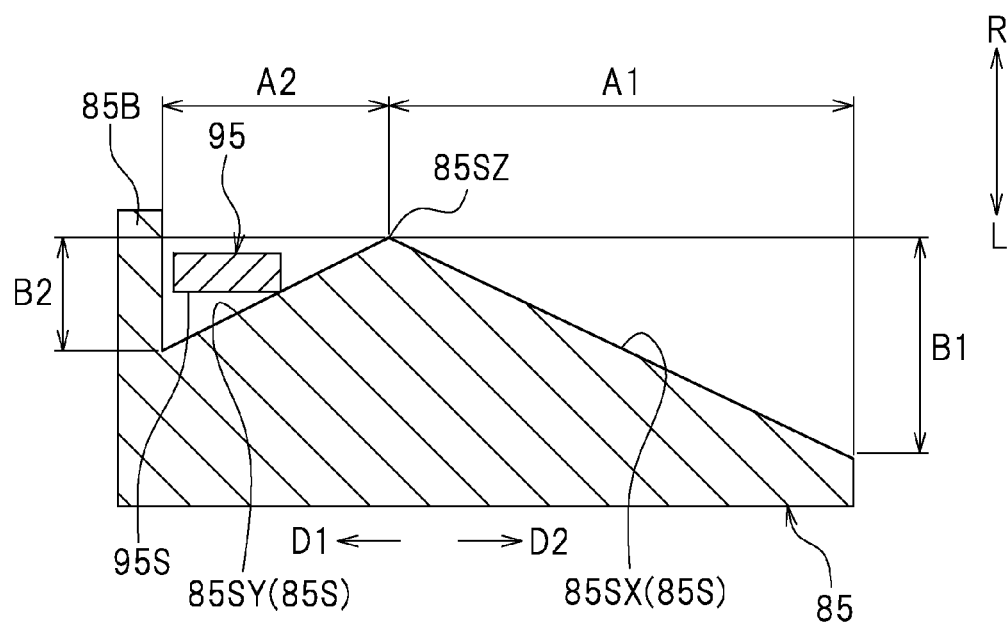
FIG. 9 is a cross-sectional view taken along the line IX-IX in FIG. 8.

As illustrated in FIG. 7, each second engagement surface 85S preferably includes a first inclined surface 85SX inclined in a direction away from the handle 94 along a first direction D1, and a second inclined surface 85SY inclined in a direction toward the handle 94 along the first direction D1. The term "direction away from the handle 94" refers to a direction extending along the rotation axis L3 of the handle 94 from the handle 94 toward the air cleaner case 82. In other words, the term "direction away from the handle 94" refers to a direction indicated by an arrow P1 in FIG. 5. The term "direction toward the handle 94" refers to a direction extending along the rotation axis L3 of the handle 94 from the air cleaner case 82 toward the handle 94. In other words, the term "direction toward the handle 94" refers to a direction indicated by an arrow P2 in FIG. 5. As illustrated in FIG. 8, the first and second inclined surfaces 85SX and 85SY are preferably continuous with each other at points 85SZ of the second engagement portions 85 which are farthest from the handle 94. As illustrated in FIG. 9, a length A1 of each first inclined surface 85SX along the first direction D1 is longer than a length A2 of each second inclined surface 85SY along the first direction D1. A height B1 of each first inclined surface 85SX in the width direction of the vehicle is greater than a height B2 of each second inclined surface 85SY in the width direction of the vehicle. As illustrated in FIG. 8, each second engagement portion 85 preferably includes a rotation stopper wall 85B. Each rotation stopper wall 85B extends in the direction away from the handle 94. Each rotation stopper wall 85B is adjacent to the associated second inclined surface 85SY.

As illustrated in FIG. 5, the first filter element 98 is secured between the lid 90 and the air cleaner case 82. A direction extending along the axis L1 of the first filter element 98 from the lid 90 toward the first engagement portions 95 is defined as a third direction D3. A direction extending along the axis L1 of the first filter element 98 from the first engagement portions 95 toward the lid 90 is defined as a fourth direction D4. A pressing force is applied from the lid 90 to the first filter element 98 in the third direction D3, and a pressing force is applied from the air cleaner case 82 to the first filter element 98 in the fourth direction D4.

As illustrated in FIG. 5, the first filter element 98 divides an inner space of the air cleaner case 82 into a first chamber 82A and a second chamber 82B. The first chamber 82A is a "dirty side" chamber. Specifically, the first chamber 82A is a space in which air to be cleaned by the first filter element 98 flows. The second chamber 82B is a "clean side" chamber. Specifically, the second chamber 82B is a space in which air that has been cleaned by the first filter element 98 flows.

As illustrated in FIG. 5, the second filter element 99 divides an inner space of the second chamber 82B of the air cleaner case 82 into a third chamber 82C and a fourth chamber 82D. The third chamber 82C is located in an upstream portion of the second chamber 82B. The fourth chamber 82D is located in a downstream portion of the second chamber 82B. The third chamber 82C is a space in which air to be cleaned by the second filter element 99 flows. The fourth chamber 82D is a space in which air that has been cleaned by the second filter element 99 flows. The second filter element 99 is disposed to intersect the extension L2 of the axis L1 of the first filter element 98.

The first filter element 98 includes a mesh having a size larger than mesh in the second filter element 99. Each of the first and second filter elements 98 and 99 according to the present preferred embodiment is preferably a wet element that is impregnated with oil, for example. Alternatively, each of the first and second filter elements 98 and 99 may be a dry element that is not impregnated with oil, for example.

As illustrated in FIG. 5, the air cleaner 80 preferably includes a gasket 78 disposed between the lid 90 and the opening end portion 82E of the air cleaner case 82. The gasket 78 is disposed inside the groove 91 of the lid 90. The gasket 78 seals a gap between the opening end portion 82E and the lid 90. The gasket 78 is disposed to extend across an entire circumferential region where the opening end portion 82E and the lid 90 face each other.

As illustrated in FIG. 1, the first suction pipe 86 is disposed above the battery 69. As illustrated in FIG. 2, the first suction pipe 86 is disposed rearward relative to the battery 69. A portion of the first suction pipe 86 is disposed inside the battery case 68. As illustrated in FIG. 4, the first suction pipe 86 preferably includes an air inlet 87 through which air is sucked into the air cleaner 80 from outside the air cleaner 80. More specifically, air is sucked into the first chamber 82A (see FIG. 5) from outside the air cleaner case 82 through the air inlet 87. As illustrated in FIG. 2, the air inlet 87 communicates with an interior of the battery case 68. As illustrated in FIG. 1, the air inlet 87 is disposed above the first and second seat portions 14L and 14R.

As illustrated in FIGS. 1 and 5, each second suction pipe 88 is connected to the cylinder head 73 of the engine 70 via a throttle body (not illustrated). Each second suction pipe 88 is disposed downstream of the second filter element 99. Each second suction pipe 88 preferably includes an air outlet 89 through which air inside the air cleaner 80 is discharged out of the air cleaner 80. More specifically, air inside the second chamber 82B is discharged out of the air cleaner case 82 through each air outlet 89. Thus, air inside the fourth chamber 82D is supplied through each air outlet 89 to the cylinder head 73 via the throttle body.

Figure 10:
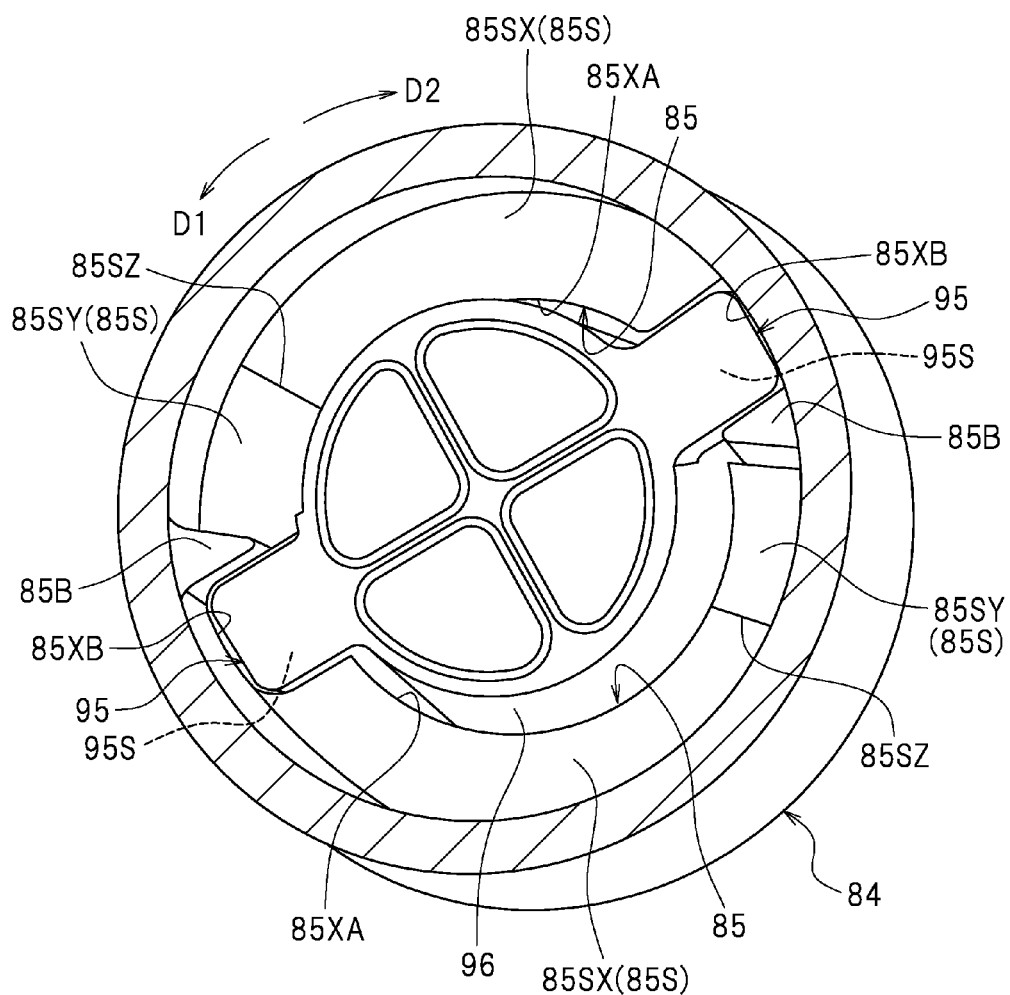
FIG. 10 is a perspective view of a portion of the air cleaner according to a preferred embodiment of the present invention, with the first and second engagement portions not engaged with each other.
Figure 11:
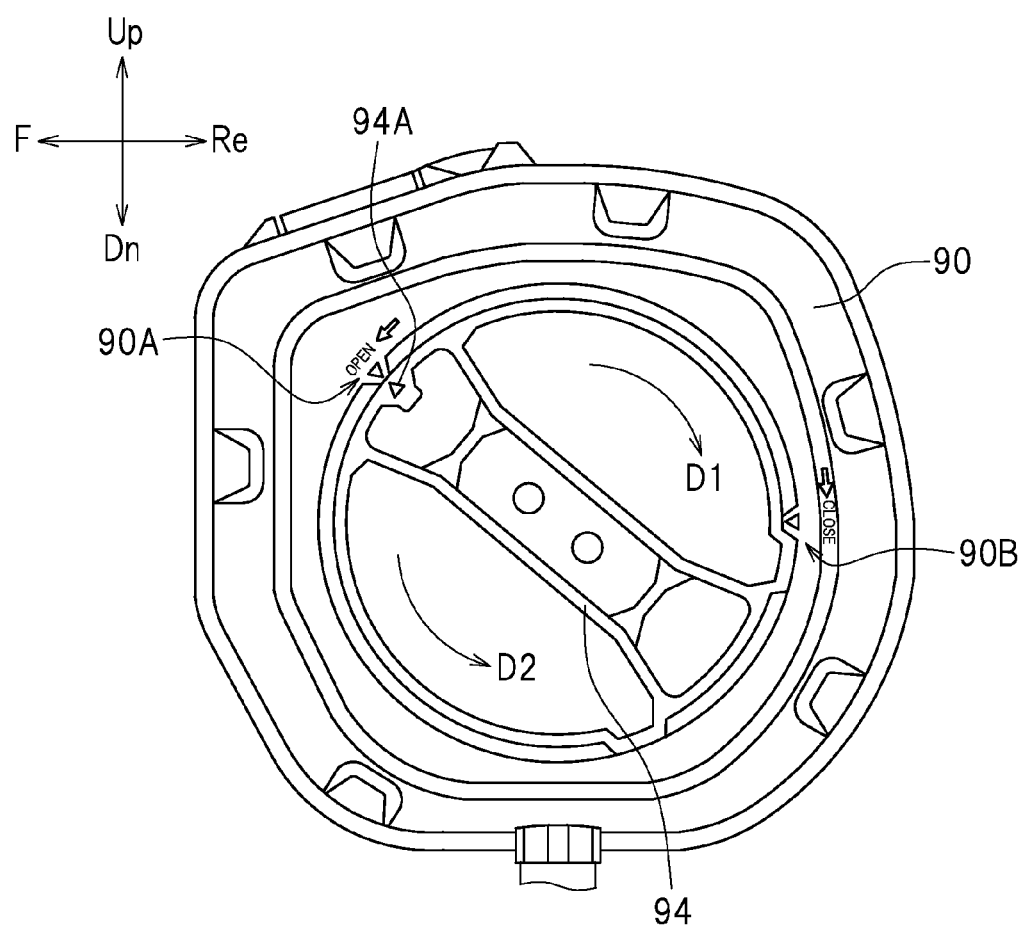
FIG. 11 is a left side view of a lid according to a preferred embodiment of the present invention.

Next, how the first and second engagement portions 95 and 85 are engaged with and disengaged from each other will be described. As illustrated in FIG. 10, the rod 96 is inserted into the first opening 85XA, and the first engagement portions 95 are inserted into the second openings 85XB. In this case, an arrow 94A of the handle 94 points at a first sign 90A on the lid 90 as illustrated in FIG. 11. When the arrow 94A points at the first sign 90A, the lid 90 is not fixed to the air cleaner case 82. As illustrated in FIG. 9, rotation of the handle 94 in the first direction D1 in FIG. 11 causes the first engagement portions 95 to move along the first direction D1, with the first engagement surfaces 95S and the first inclined surfaces 85SX in contact with each other. Thus, the lid 90 gradually moves in a direction toward the air cleaner case 82. Further rotation of the handle 94 in the first direction D1 in FIG. 11 causes the first engagement surfaces 95S to move beyond the points 85SZ farthest from the handle 94 and come into contact with the second inclined surfaces 85SY. As a result, engagement of the first and second engagement portions 95 and 85 is completed. This engagement of the first and second engagement portions 95 and 85 fixes the lid 90 to the air cleaner case 82. In this case, the arrow 94A of the handle 94 points at a second sign 90B on the lid 90 as illustrated in FIG. 4. When the arrow 94A points at the second sign 90B, the lid 90 is fixed to the air cleaner case 82. The handle 94 rotates by an angle of about 360 degrees or less. More specifically, the handle 94 rotates by an angle of about 360 degrees or less to move from a position at which the arrow 94A of the handle 94 points at the first sign 90A to a position at which the arrow 94A of the handle 94 points at the second sign 90B. The handle 94 preferably rotates by an angle of about 140 degrees, for example, in the present preferred embodiment.

The handle 94 also rotates in a second direction D2 opposite to the first direction D1 in FIG. 11, with the first and second engagement portions 95 and 85 engaged with each other. As illustrated in FIG. 9, the rotation of the handle 94 in the second direction D2 causes the first engagement portions 95 to move along the second direction D2, with the first engagement surfaces 95S and the second inclined surfaces 85SY in contact with each other. Further rotation of the handle 94 in the second direction D2 in FIG. 11 causes the first engagement surfaces 95S to move beyond the points 85SZ farthest from the handle 94 and come into contact with the first inclined surfaces 85SX, while causing the first engagement portions 95 to move along the second direction D2. Thus, the lid 90 gradually moves in a direction away from the air cleaner case 82, and then the first and second engagement portions 95 and 85 are disengaged from each other. The disengagement of the first and second engagement portions 95 and 85 allows the lid 90 to be detached from the air cleaner case 82.

Figure 12:
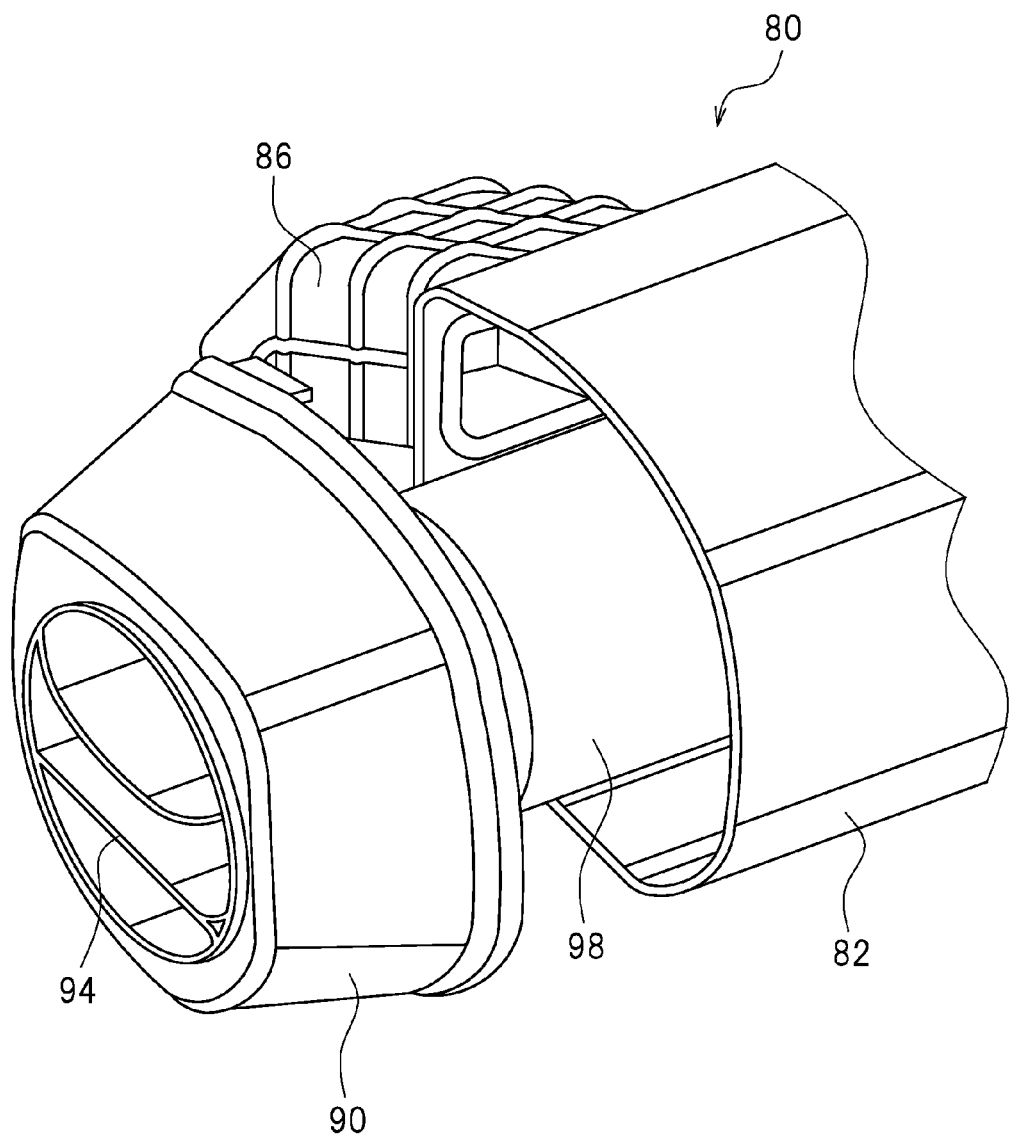
FIG. 12 is a perspective view of the air cleaner according to a preferred embodiment of the present invention, with the lid detached from the air cleaner to expose a first filter element.

As illustrated in FIG. 12, detaching the lid 90 from the air cleaner case 82 allows the first filter element 98, disposed inside the air cleaner case 82, to move along an axial direction of the first filter element 98. Thus, the first filter element 98 is easily detached from the air cleaner case 82 because the lid 90 is exposed above the placement surface 62 of the cargo bed 60.

The second engagement surfaces 85S according to the present preferred embodiment preferably include the first and second inclined surfaces 85SX and 85SY as illustrated in FIG. 7, but the second engagement surfaces 85S are required to include the first inclined surfaces 85SX only in some preferred embodiments of the present invention. Although the second engagement surfaces 85S according to the present preferred embodiment preferably include the first and second inclined surfaces 85SX and 85SY, the first engagement surfaces 95S may include the first inclined surfaces only in some other preferred embodiments of the present invention. Alternatively, each of the first and second engagement surfaces 95S and 85S may include the first and second inclined surfaces.

In the present preferred embodiment, the first and second engagement portions 95 and 85 respectively include the first and second engagement surfaces 95S and 85S, and the first and second engagement surfaces 95S and 85S come into contact with each other, thus engaging the first and second engagement portions 95 and 85 with each other. However, the first and second engagement portions 95 and 85 may be engaged with each other in any other suitable manner. For example, the first and second engagement portions 95 and 85 may be respectively provided with external and internal threads, or may be respectively provided with internal and external threads, and the external and internal threads may be engaged with each other, thus engaging the first and second engagement portions 95 and 85 with each other.

As described above, the air cleaner 80 enables the first engagement portions 95 to rotate along the first direction D1 or the second direction D2 with the rotation of the handle 94 as illustrated in FIG. 8. Upon rotation of the first engagement portions 95 along the first direction D1, the first and second engagement portions 95 and 85 are engaged with each other. This fixes the lid 90 to the air cleaner case 82. In contrast, upon rotation of the first engagement portions 95 along the second direction D2, the first and second engagement portions 95 and 85 are disengaged from each other as illustrated in FIG. 10. This enables the lid 90 to be detached from the air cleaner case 82. Thus, the lid 90 is easily detached from or fixed to the air cleaner case 82 by simply rotating the handle 94. As illustrated in FIG. 5, the lid 90 is disposed along the extension line L2 of the axis L1 of the first filter element 98. This allows the first filter element 98 to be axially pulled out of the air cleaner case 82 when the lid 90 is detached from the air cleaner case 82, thus easily detaching the first filter element 98 from the air cleaner case 82.

As illustrated in FIG. 5, the rotation axis L3 of the handle 94 according to the present preferred embodiment extends parallel or substantially parallel to the axis L1 of the first filter element 98 and is located inward of the first filter element 98. This enables the handle 94 to be more compactly disposed in the lid 90 than when the rotation axis L3 of the handle 94 is located outward of the first filter element 98.

As illustrated in FIG. 5, the rotation axis L3 of the handle 94 according to the present preferred embodiment is coaxial with the axis L1 of the first filter element 98. This enables the handle 94 to be more compactly disposed in the lid 90.

As illustrated in FIG. 9, the first inclined surfaces 85SX, inclined in the direction away from the handle 94 along the first direction D1, and the second inclined surfaces 85SY, inclined in the direction toward the handle 94 along the first direction D1, are continuous with each other at the points 85SZ of the second engagement portions 85 farthest from the handle 94 in the present preferred embodiment. Thus, the first engagement surfaces 95S of the first engagement portions 95 move along the first inclined surfaces 85SX of the second engagement portions 85 while the first engagement portions 95 rotate along the first direction D1. This gradually moves the lid 90 toward the air cleaner case 82 so as to firmly fix the lid 90 and the air cleaner case 82 to each other. Then, the first engagement surfaces 95S of the first engagement portions 95 move from the first inclined surfaces 85SX of the second engagement portion 85 to the second inclined surfaces 85SY thereof. Consequently, the lid 90 is prevented from being loosened from the air cleaner case 82 in the second direction D2.

As illustrated in FIG. 5, the first filter element 98 according to the present preferred embodiment is secured between the lid 90 and the air cleaner case 82. The first filter element 98 is secured between the lid 90 and the air cleaner case 82 by engaging the first and second engagement portions 95 and 85 with each other. Consequently, the first filter element 98 is reliably secured inside the air cleaner case 82.

As illustrated in FIG. 5, the air cleaner 80 according to the present preferred embodiment preferably includes the gasket 78 disposed between the lid 90 and the opening end portion 82E of the air cleaner case 82. The engagement of the first and second engagement portions 95 and 85 applies a force from the air cleaner case 82 to the gasket 78 in the fourth direction D4 in FIG. 5, and applies a force from the lid 90 to the gasket 78 in the third direction D3 in FIG. 5. This enables the gasket 78 to more effectively seal a gap between the lid 90 and the opening end portion 82E of the air cleaner case 82.

As illustrated in FIG. 3, the handle 94 and the lid 90 according to the present preferred embodiment are separate components. The handle 94 is configured to be rotatable relative to the lid 90, and the lid 90 is configured to be non-rotatable relative to the air cleaner case 82. Thus, when the lid 90 is attached to or detached from the air cleaner case 82, only the handle 94 rotates, while the lid 90 does not rotate. This prevents wearing away of the gasket 78 disposed between the air cleaner case 82 and the lid 90.

As illustrated in FIG. 5, the second engagement portions 85 according to the present preferred embodiment are disposed on the support 84 located inward of the first filter element 98. This makes the lid 90 and the air cleaner case 82 smaller than when the second engagement portions 85 are disposed outward of the first filter element 98.

The air cleaner 80 according to the present preferred embodiment enables the lid 90 to be easily detached from or fixed to the air cleaner case 82 by simply rotating the handle 94 by an angle of about 360 degrees or less.

As illustrated in FIGS. 4 and 5, the air cleaner 80 according to the present preferred embodiment preferably includes the first suction pipe 86 including the air inlet 87 through which air is sucked into the first chamber 82A from outside the air cleaner case 82, and the second suction pipes 88 including the air outlets 89 through which air inside the second chamber 82B is discharged out of the air cleaner case 82. Thus, the first chamber 82A located outside the first filter element 98 defines the dirty side chamber, making it possible to visually determine contamination of the first filter element 98. Consequently, contamination of the first filter element 98 is determined more easily than when the second chamber 82B located inside the first filter element 98 defines the dirty side chamber.

As illustrated in FIG. 5, the lid 90 according to the present preferred embodiment is disposed on the end of the air cleaner case 82 opposite to the portion of the air cleaner case 82 where the second suction pipes 88 are disposed. This enables the lid 90 to be easily attached to or detached from the air cleaner case 82 no matter what structure the second suction pipes 88 may have.

As illustrated in FIG. 5, the air cleaner 80 according to the present preferred embodiment preferably includes the second filter element 99 that divides the second chamber 82B into the third chamber 82C and the fourth chamber 82D. This enables air, which has been sucked from outside the air cleaner case 82 and passed through the first filter element 98, to be cleaned more effectively.

As illustrated in FIG. 5, the second filter element 99 according to the present preferred embodiment is disposed to intersect the extension line L2 of the axis L1 of the first filter element 98. This enables the second filter element 99 to be compactly disposed inside the air cleaner case 82.

The first filter element 98 according to the present preferred embodiment includes a mesh having a size larger than mesh in the second filter element 99. This enables the first filter element 98 to catch large dust particles from air sucked in from outside the air cleaner case 82. The air is then further cleaned through the second filter element 99 and thus effectively cleaned.

The terms and expressions which have been used herein are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of illustrative preferred embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An air cleaner comprising:
   an air cleaner case including an opening;
   a first filter element having a tubular or substantially tubular shape and detachably disposed inside the air cleaner case;
   a lid disposed along an extension line of an axis of the first filter element and detachably attached to the air cleaner case so as to cover the opening, the lid including a rotatable handle;
   at least one first engagement portion configured to rotate in accordance with rotation of the handle; and
   at least one second engagement portion connected to the air cleaner case and arranged to engage with the first engagement portion; wherein
   the lid is arranged so that, when the first engagement portion is rotated along a first direction and thus engaged with the second engagement portion, the lid is fixed to the air cleaner case, and when the first engagement portion is rotated along a second direction opposite to the first direction and thus disengaged from the second engagement portion, the lid is detached from the air cleaner case; and
   the first engagement portion and the second engagement portion are disposed inside the first filter element.

2. The air cleaner according to claim 1, wherein a rotation axis of the handle extends parallel or substantially parallel to the axis of the first filter element and is located inward of the first filter element.

3. The air cleaner according to claim 2, wherein the rotation axis of the handle is coaxial with the axis of the first filter element.

4. The air cleaner according to claim 1, wherein the first engagement portion includes a first engagement surface arranged to come into contact with the second engagement portion;
   the second engagement portion includes a second engagement surface arranged to come into contact with the first engagement surface of the first engagement portion and to be disposed between the first engagement surface and the handle; and
   at least one of the first engagement surface and the second engagement surface includes an inclined surface inclined in a direction away from the handle along the first direction.

5. The air cleaner according to claim 4, wherein the inclined surface includes:
   a first inclined surface inclined in the direction away from the handle along the first direction; and
   a second inclined surface inclined in a direction toward the handle along the first direction; and
   the first inclined surface and the second inclined surface are continuous with each other at a point of the first engagement portion or the second engagement portion farthest from the handle.

6. The air cleaner according to claim 4, wherein the first filter element is secured between the lid and the air cleaner case.

7. The air cleaner according to claim 4, further comprising a gasket disposed between the lid and an opening end portion of the air cleaner case.

8. The air cleaner according to claim 7, wherein the handle and the lid are separate components; the handle is rotatable relative to the lid; and the lid is non-rotatable relative to the air cleaner case.

9. The air cleaner according to claim 1, wherein the air cleaner case includes a support disposed inward of the first filter element; an axis of the support extends parallel or substantially parallel to the axis of the first filter element; and the second engagement portion is disposed on the support.

10. The air cleaner according to claim 1, wherein the handle is configured to rotate by an angle of about 360 degrees or less.

11. The air cleaner according to claim 1, wherein the first filter element divides an inner space of the air cleaner case into a first chamber and a second chamber, and the air cleaner further includes:
    a first suction pipe including an air inlet through which air is sucked into the first chamber from outside the air cleaner case; and
    at least one second suction pipe including an air outlet through which air inside the second chamber is discharged out of the air cleaner case.

12. The air cleaner according to claim 11, wherein the lid is disposed on an end of the air cleaner case opposite to a portion of the air cleaner case where the second suction pipe is disposed.

13. The air cleaner according to claim 11, further comprising a second filter element that divides the second chamber into an upstream chamber and a downstream chamber.

14. The air cleaner according to claim 13, wherein the second filter element is disposed to intersect the extension line of the axis of the first filter element.

15. The air cleaner according to claim 13, wherein the first filter element includes mesh having a size larger than a mesh of the second filter element.

16. An air cleaner comprising:
    an air cleaner case including an opening;
    a first filter element having a tubular or substantially tubular shape and detachably disposed inside the air cleaner case;
    a lid disposed along an extension line of an axis of the first filter element and detachably attached to the air cleaner case so as to cover the opening, the lid including a rotatable handle;

at least one first engagement portion configured to rotate in accordance with rotation of the handle; and at least one second engagement portion connected to the air cleaner case and arranged to engage with the first engagement portion; wherein the lid is arranged so that, when the first engagement portion is rotated along a first direction and thus engaged with the second engagement portion, the lid is fixed to the air cleaner case, and when the first engagement portion is rotated along a second direction opposite to the first direction and thus disengaged from the second engagement portion, the lid is detached from the air cleaner case;

the handle and the lid are separate components;

the handle is rotatable relative to the lid; and the lid is non-rotatable relative to the air cleaner case.

17. The air cleaner according to claim 16, wherein the air cleaner case includes a support disposed inward of the first filter element; an axis of the support extends parallel or substantially parallel to the axis of the first filter element; and the second engagement portion is disposed on the support.

* * * * *